May 9, 1939.  E. EATON  2,157,657

VEHICLE BUMPER

Filed April 11, 1938

Inventor.
Elton Eaton

By

Attorneys.

Patented May 9, 1939

2,157,657

UNITED STATES PATENT OFFICE 2,157,657

VEHICLE BUMPER

Elton Eaton, Beloit, Wis.

Application April 11, 1938, Serial No. 201,357

1 Claim. (Cl. 293—55)

My invention refers to vehicle bumpers, and it has for its primary object to provide a bumper having yieldable ends.

In practice it has been found that the bumper ends project beyond the wheels of a vehicle to such an extent that a passing vehicle will frequently side swipe the rigid projecting ends of a bumper and cause serious accidents.

My invention, therefore, is primarily designed to overcome this objectionable feature.

With the above and other objects in view, the invention consists in certain peculiarities of construction and combination of parts as will be hereinafter more fully set forth in the accompanying drawing and subsequently claimed.

Figure 1:
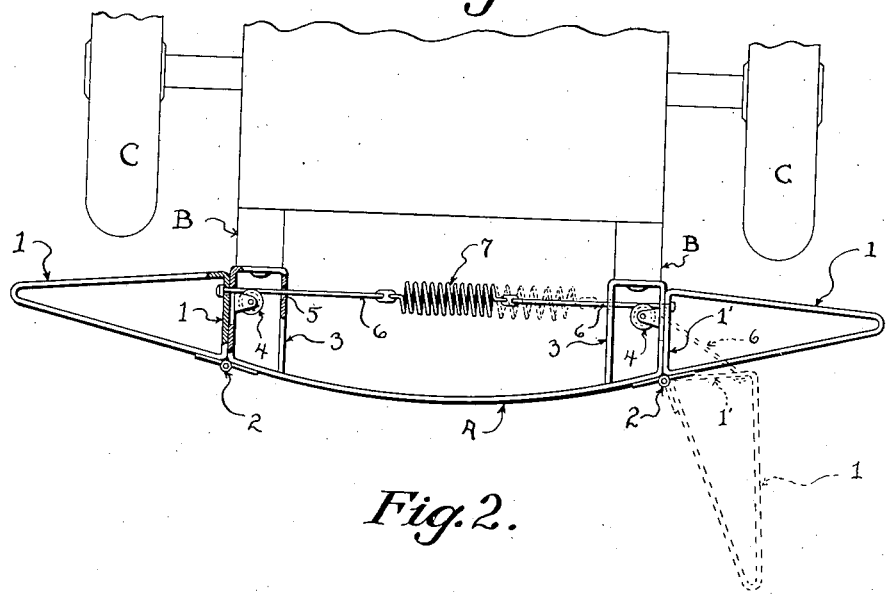
Figure 1 represents a plan view of a bumper embodying the features of my invention, shown attached to the fragmentary end of an automobile.
Figure 2:
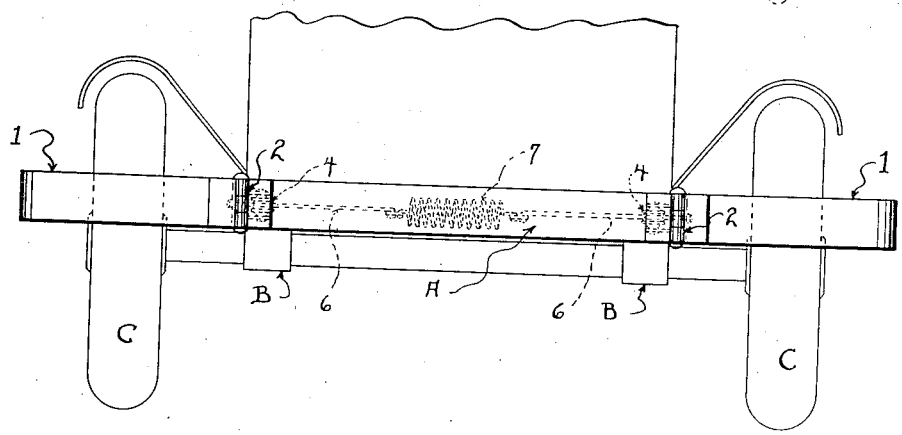
Figure 2 is an end view of the same.

Referring by characters to the drawing, A represents a bumper of standard type, and B the auto frame to which it is attached.

As shown, the end sections 1 of the bumper, in this exemplification of my invention, are illustrated as triangular in form, and these end sections are secured to the bumper A by hinges 2, it being observed that the extreme ends of the extensions 1 project beyond the wheels C of an automobile of any type. These extensions may be in the form of attachments to the ends of bumpers.

The base section 1' of the end extensions is adapted to abut one wall of a rectangular skeleton bracket 3, which bracket carries anti-frictional rollers 4, and the inner walls of the bracket are formed with apertures 5, through which runners 6 extend. The ends of the runners are connected to the base section 1' of the bumper extension, and said runners travel over the rollers and are connected by a spring 7.

Figure 3:
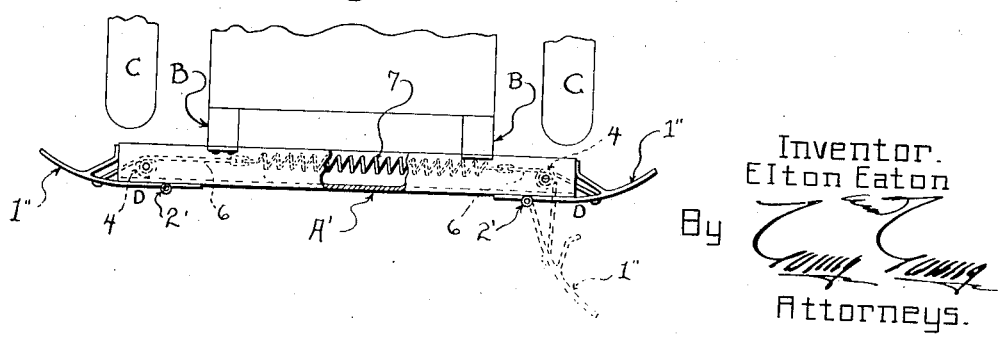
Figure 3 illustrates a plan view or modified form of bumper having a yielding end section.

As shown in Figure 3 of the drawing, the bumper A' proper is of the channeled variety, but it is understood that the bumpers may be of any standard form, either in the shape of spring leaves, or a single element. The bumper A' is provided with hinges 2', which carry extension wings 1" that normally project beyond the line of the wheels.

When the bumper is in its normal position, as shown at D, the extensions rest against the ends of the bumper proper, and said extensions are provided with rollers, runners, and springs, similar to the structure previously described. In all instances, when the extensions of bumpers are hit by a vehicle traveling in the opposite direction, said end extensions will yield under spring control, to avoid sudden shock or impact with a solid part, which will cause serious damage.

While I have shown two exemplifications of my invention minutely as to detail, it is understood that I may vary the structural features within the scope of the claim.

I claim:

A bumper for vehicles comprising, a body portion, bumper sections pivoted to the ends of the body portion, rollers mounted upon said body portion adjacent the end sections, runners secured to the end sections, and trained over the rollers, and a single coil spring connecting the runners.

ELTON EATON.